US009409228B2

(12) United States Patent
Renard et al.

(10) Patent No.: US 9,409,228 B2
(45) Date of Patent: Aug. 9, 2016

(54) METHOD FOR ATTACHING THE COVER OF A CENTRIFUGAL COMPRESSOR OF A TURBINE ENGINE, COMPRESSOR COVER IMPLEMENTING SAME AND COMPRESSOR ASSEMBLY PROVIDED WITH SUCH A COVER

(75) Inventors: Beatrice Marie Renard, Nay (FR); Geoffroy Louis-Henri Marie Billotey, Voiron (FR)

(73) Assignee: TURBOMECA, Bordes (FR)

( * ) Notice: Subject to any disclaimer, the term of this patent is extended or adjusted under 35 U.S.C. 154(b) by 645 days.

(21) Appl. No.: 13/880,245

(22) PCT Filed: Oct. 20, 2011

(86) PCT No.: PCT/FR2011/052448
§ 371 (c)(1),
(2), (4) Date: Apr. 18, 2013

(87) PCT Pub. No.: WO2012/052687
PCT Pub. Date: Apr. 26, 2012

(65) Prior Publication Data
US 2013/0202428 A1  Aug. 8, 2013

(30) Foreign Application Priority Data
Oct. 21, 2010  (FR) ...................................... 10 58587

(51) Int. Cl.
| F01D 11/18 | (2006.01) |
| B21K 3/00 | (2006.01) |
| F01D 11/08 | (2006.01) |
| F01D 25/24 | (2006.01) |
| F02C 3/08 | (2006.01) |

(52) U.S. Cl.
CPC . *B21K 3/00* (2013.01); *F01D 11/08* (2013.01); *F01D 11/18* (2013.01); *F01D 25/246* (2013.01);

(Continued)

(58) Field of Classification Search
CPC ........ F01D 11/08; F01D 11/18; F01D 25/246
See application file for complete search history.

(56) References Cited

U.S. PATENT DOCUMENTS

| 4,264,271 A | 4/1981 | Libertini |
| 2005/0118019 A1* | 6/2005 | Roberts .................. F01D 9/045 |
| | | 415/206 |

(Continued)

FOREIGN PATENT DOCUMENTS

| EP | 1 903 185 | 3/2008 |
| EP | 2 026 006 | 2/2009 |

OTHER PUBLICATIONS

International Search Report Issued Feb. 13, 2012 in PCT/FR11/52448 Filed Oct. 20, 2011.

*Primary Examiner* — Nathaniel Wiehe
*Assistant Examiner* — Brian O Peters
(74) *Attorney, Agent, or Firm* — Oblon, McClelland, Maier & Neustadt, L.L.P.

(57) ABSTRACT

An attachment arrangement at a middle of a cover having an elastically deformable portion. The cover includes a concave shell including an inner surface spaced apart from the compressor including an impeller including blades by an attachment. The attachment includes one connection end at the middle of the shell, another end attached to a casing of the turbine engine, and an axisymmetric diaphragm having a generally frusto-conical configuration having an arm profile coupled to the end for attachment to the casing by a double-elbow joint having right and obtuse angles when in a rest position. The distance between the inner surface of the shell and upper edges of the blades can be held constant during operation with minimum clearance adjustment. The cover can be moved such that clearance between the cover and blades of the compressor impeller remains substantially constant and as low as possible.

8 Claims, 2 Drawing Sheets

(51) Int. Cl.
*F04D 29/16* (2006.01)
*F04D 29/42* (2006.01)

(52) U.S. Cl.
CPC ............... *F02C 3/08* (2013.01); *F04D 29/162* (2013.01); *F04D 29/4206* (2013.01); *Y10T 29/49236* (2015.01)

(56) References Cited

U.S. PATENT DOCUMENTS

2008/0069690 A1    3/2008   Ivakitch et al.
2010/0031663 A1    2/2010   Commaret et al.

\* cited by examiner

METHOD FOR ATTACHING THE COVER OF A CENTRIFUGAL COMPRESSOR OF A TURBINE ENGINE, COMPRESSOR COVER IMPLEMENTING SAME AND COMPRESSOR ASSEMBLY PROVIDED WITH SUCH A COVER

FIELD OF THE INVENTION

The invention relates to a method for attaching the cover of a centrifugal compressor of a turbine engine, to a cover implementing this method, as well as to a centrifugal compressor assembly provided with such a cover. Every type of aircraft, in particular helicopters or airplanes, can be provided with a turbine engine. The conformation is said to be optimized in the sense that it brings a minimized and substantially constant clearance between the cover and the impeller during all flight phases.

Impeller cover attachments are configured in the form of flexible diaphragms so that it is possible to adjust the positioning of the cover during the operation of the centrifugal compressor. The typically desired positioning aims at holding a minimal clearance between the cover and the impeller blades during all flight phases, whether at compressor transitory running speeds or intermediate steady-state speeds.

Typically, air flow temperature and pressure in the impeller of a centrifugal compressor increase substantially by 30 to 40% from the leading edge to the trailing edge of the impeller. This differential has the effect of upstreamwardly tilting the blade radial portions which are close to the trailing edge, and thus moving the impeller closer to the cover gradually from upstream to downstream. Furthermore, an additional increase in temperature in the region of these trailing edge radial portions results from the heat radiated by the turbine of the turbine engine. This additional contribution also increases the tilting of the blades towards the compressor cover.

Besides, the centrifugal forces resulting from the high rotational speed of the impeller also contribute to this tilting. These centrifugal forces also lead to a radial dilatation, in particular of the axial portion of the cover, on the leading edge side of the latter.

In these conditions, clearance between the cover and the centrifugal compressor impeller has a differential which varies locally along the impeller, between the leading edge and the trailing edge, and which varies according to the running phase of the compressor. Now clearance between the cover and the impeller is an essential factor in terms of efficiency of the centrifugal compressor. In order to improve this efficiency, a cover/impeller clearance which is as constant and low as possible—without any risk of prolonged contact—is desirable.

STATE OF THE ART

Generally, the cover is clamped to an annular support by means of an attachment in the form of an annular diaphragm. There are several ways of positioning the annular attachment on the cover and study the behaviour of the cover/impeller clearance according to this positioning. This attachment can originate:
  from the leading edge, i.e. upstream at the axial inlet of the impeller blades;
  from the trailing edge, i.e. downstream at the radial outlets of the blades, or
  from inside the elbow of the cover, formed by the concave curvature of the cover between the upstream and downstream edges, in particular halfway between these edges.

A connection at leading edge is incompatible with an air bleed from the cover. As a matter of fact, there is no tightness between the air which is taken and the one which flows between the cover and the diffuser and this causes recirculations. Now, an air bleed is generally provided as a power source for the turbine-engine or aircraft equipments.

A connection at trailing edge does not make it possible for the cover to follow the movement of the impeller, in particular for its radial part i.e. where the movement is the most important: the cover/impeller clearance is sized so as to have a given value when the turbine engine is at maximum take-off thrust, in an abbreviated form MTO. But this clearance cannot be optimized at steady-state intermediate speeds or at transient speeds.

A double connection, both at trailing edge and inside the elbow as described in patent document EP 1 167 722, or at leading edge and inside the elbow as mentioned in U.S. Pat. No. 5,555,721, lead to the same conclusions about the movement problem of the cover with regard to the tilt of the impeller blades.

A single connection inside the elbow of the cover does not make it possible to remove the drawbacks of either double connections or connection at trailing edge because the behaviour of the cover does not follow the movement of the blades, in particular the upstreamwardly movement, so as to limit clearance adjustment.

An architecture with single connection inside the elbow is described for example in U.S. Pat. No. 4,264,271 wherein the cover attachment is an extension in the form of a radial rim (50) fixed to an annular support (42) by means of clamps. The rim can deform under the influence of pressure and temperature. This deformation makes it possible to move the concave cover so as to keep the same distance from the impeller blades.

However, the radial movement of the junction (56) is very much limited by the rim (50) which works in compression. Thus this type of architecture restricts the rotation of the meridian line of the cover naturally caused by the existing temperature gradient on the cover.

DISCLOSURE OF THE INVENTION

The present invention aims on the contrary at enabling a movement of the cover so that clearance between the cover and the impeller blades remains the lowest possible in a wide range of deformation of the impeller. To do this, the invention provides an attachment arrangement of the "in the middle of cover" type having a specific portion.

More precisely, the object of the present invention is a method for attaching the impeller cover of a centrifugal compressor of a turbine engine, in which the cover has a concave shell and an axisymmetric connection between a junction formed substantially in the middle of the shell and a peripheral axial attachment holding the shell apart from the impeller. A portion that is elastically bendable is arranged on the said connection, away from the junction to the shell, so that the distance between the shell and the impeller is hold constant with minimal clearances at intermediate and transient speeds. The presence of such a portion ensures a substantially constant distance during operation, which enables an adjustment of clearances to the very minimum at intermediate and transient speeds, as well as a behaviour of the attachment which remains as similar as possible to the behaviour of the impeller at these intermediate and transient speeds.

According to particular embodiments, the deformable portion is arranged near the attachment of the connection and the connection joins the shell by means of a conformation which is substantially radial with regard to the curvature of the shell at the junction.

The invention also relates to a cover implementing the above method, the cover having a concave shell with a internal surface arranged apart from the compressor fitted with an impeller provided with blades by means of an attachment having a junction end formed substantially in the middle of the shell and another end fixed to a casing of the turbine engine. Such an attachment has an axisymmetric diaphragm of generally frusto-conical conformation which has an arm profile coupled together at the end for attachment with the casing by means of a double-elbow joint having right and obtuse angles when in the rest position, this joint being arranged closer to the end for attachment than to the end for junction to the shell. The distance between the inner surface of the shell and the upper edges of the blades can thus be held constant during operation and set with minimal clearance adjustment at intermediate and transient speeds.

According to particular embodiments:

the diaphragm has an axial annular connection between a radial attachment rim and the double-elbow joint;

the double-elbow joint is formed when in the rest position by a joint radial rim coupled together, on the one hand, with the axial annular connection by means of an elbow at a substantially right angle and, on the other hand, with the frusto-conical arm by means of an elbow at an obtuse angle;

advantageously, the arm profile can be substantially rectilinear when in the rest position and have a substantially evolutionary thickness which increases near the junction end;

the arm has on average a thickness which is substantially lower than that of the shell of the cover.

The invention also relates to an assembly of a cover such as it is described above and a centrifugal compressor of a turbine engine. In this assembly, the cover is configured so that, on the one hand, it stays at a constant distance from the compressor and, on the other hand, it can be fixed to the casing of the turbine engine.

BRIEF DESCRIPTION OF THE DRAWINGS

Other advantages and characteristics of the invention will appear from the detailed description which follows, in reference to the accompanying drawings which show, respectively.

DETAILED DESCRIPTION

In the description, the terms "axial", "axisymmetric", "upstream" and "downstream" relate to locations along or of revolution around central axis X'X of rotation of the turbine engine, according to the direction of this central axis. The term "radial" relates to locations which are orthogonal to this central axis. Besides, elements having the same reference marks on various figures relate to identical elements.

Figure 1:
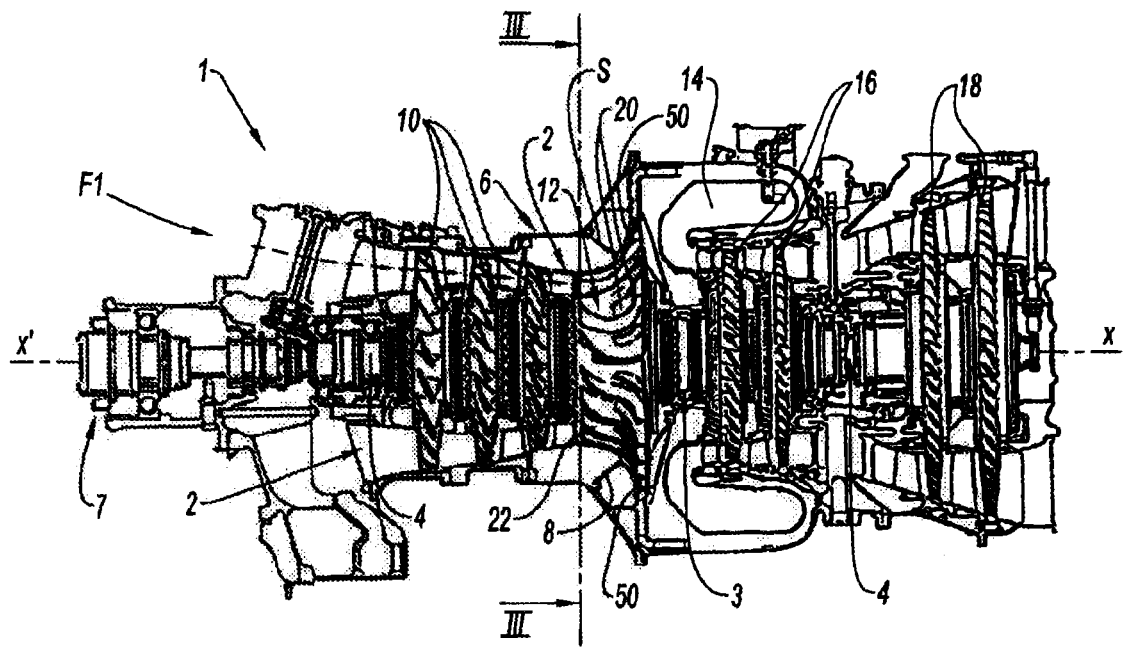
FIG. 1, a longitudinal view of a turbine engine provided with a centrifugal compressor cover according to the invention.

In reference to FIG. 1, an example of an aircraft turbine engine 1 includes mainly, in an upstream-to-downstream arrangement around central axis of rotation X'X: a three-stage axial compressor 10, a centrifugal compressor 12, combustion chambers 14, a two-stage connected power turbine 16 and a free power turbine 18 also having two stages.

The air flow F1 is compressed while flowing across compressors 10 and 12 in ducts 2, then mixed with fuel in chambers 14 in order to supply turbines 16 and 18 with kinetic energy from combustion. The stages of turbine 16 drive compressors 10 and 12 via a drive shaft 3, and the free power turbine 18 transmits power to the aircraft equipments (alternators, pumps, air conditioning) via a through shaft 4.

The turbine engine is protected by a casing 6. In the example, the turbine engine is a turboshaft engine and the aircraft is a helicopter. Free power turbines drive equipments, in particular the propeller rotor, via a main transmission gearbox 7 fitted with the appropriate gearboxes.

The centrifugal compressor 12 is provided with axial blades 20 formed on an impeller 22 so as to carry the air flow F1 and compress it when the compressor runs at high speed. As shown more precisely at FIG. 2, the duct 2 in which the flow F1 flows is limited, at the centrifugal compressor, by the blades 20 and the inner surface 51 of a concave shell 50. This shell 50 is supported by an extension forming an attachment 8 fixed to the casing 6 by means of clamps 61. The shell 50 and the attachment 8 form the cover 5. The compressed air flow F1 is then carried to combustion chambers 14 via diffusers 19.

The attachment 8 of the cover 5 originates substantially in the middle of the concave surface of the cover, for example, as illustrated, at the point of junction end 83 where the curvature of the cover is the most important. There, the attachment 8 is substantially radial to the shell 50 with regard to curvature of the cover at the contact point. The conformation of this attachment 8 is more particularly illustrated by means of the partial sectional and front views of the cover and centrifugal compressor of FIGS. 2 and 3. The impeller blades 20, the duct 2, the centrifugal compressor 12 and the shafts 3 and 4 appear at least partially on these Figs.

The shell 50 has an upstream, substantially axial, leading edge BA and a downstream, substantially radial, trailing edge BF. The attachment 8 consists of: an end forming a radial rim 82 fixed to the casing by means of clamps (see FIG. 1); and an axisymmetric diaphragm 80 having a generally frusto-conical conformation. The rim 82 is arranged substantially radially with regard to the end of the leading edge BA of the shell 50. At its end 83, the diaphragm 80 merges into the shell 50 with an appropriate mechanical reinforcement 84.

As for it, the diaphragm 80 consists of an axial annular connection 8a coupled with a rectilinear frusto-conical arm 8b via a doubly angled joint. The adjustable length of the axial connection 8a advantageously offers a degree of freedom for adaptation to the position imposed by the attaching clamps 61.

As illustrated in the rest position, the joint is formed by the assembly of a joint radial rim 8c and, on the one hand, the axial annular connection 8a—via an elbow 8d at a substantially right angle—and, on the other hand, the rectilinear arm 8b—via an elbow 8e at an obtuse angle—about 140° in the example.

In the example, the arm 8b advantageously has a substantially evolutionary thickness "E" which increases between the elbow 8e and its end 83. Furthermore, this thickness is on average lower, for instance from 1.5 to 3 times lower, than that of the shell 50. Such a thin arm thickness makes it possible to reduce the use of clearance between the internal surface 51 of the shell 50 and the upper edges 21 of the blades 20 at steady-state in-flight speeds, namely intermediate speeds, as well as the use of clearance at transient speeds. However, a too small arm thickness may increase the uses of clearance at transient speeds. A compromise is thus obtained at all intermediate speeds, without any risk of severe contact between the shell 50 and the blade edges 21, by means of this intermediate arm thickness which can also be evolutionary.

The variation in height H of the joint radial rim 8c leads to the same compromise: height H is increased to reduce the use of clearance at all steady-state speeds, but this increase is limited to avoid the risk of contact between the cover and the blades. So a 25% increase in height H means decreasing thickness of the shell 50 by 20%.

Figure 2:
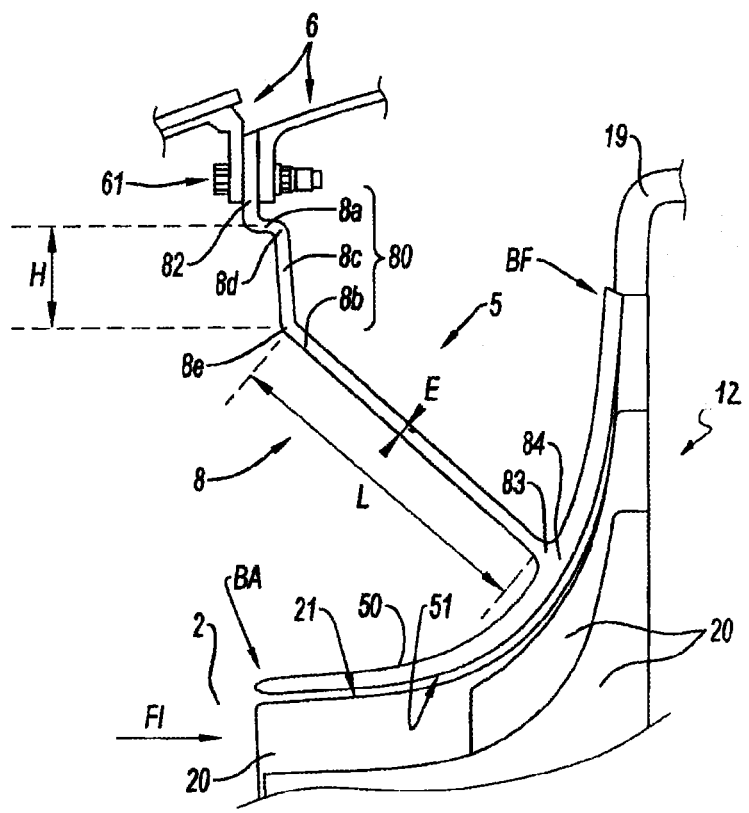
FIG. 2, a partial longitudinal sectional view of the centrifugal compressor cover of FIG. 1 when in the rest position.
Figure 3:
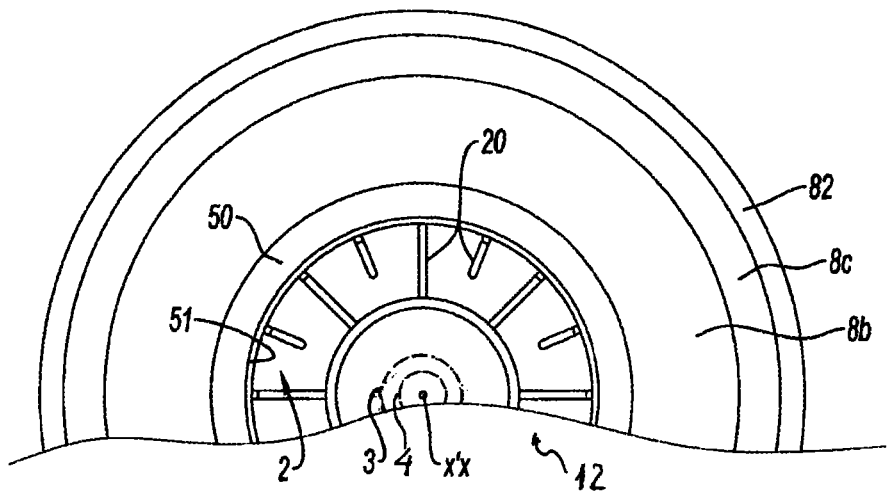
FIG. 3, a partial front view of the cover and compressor according to plane III-III of FIG. 1, and FIG. 4, the sectional view according to FIG. 2 but when the compressor is in operation, wherein the positions of the cover and compressor can be seen during operation with regard to those of FIG. 2, when in the rest position, which appear in dotted lines.
Figure 4:
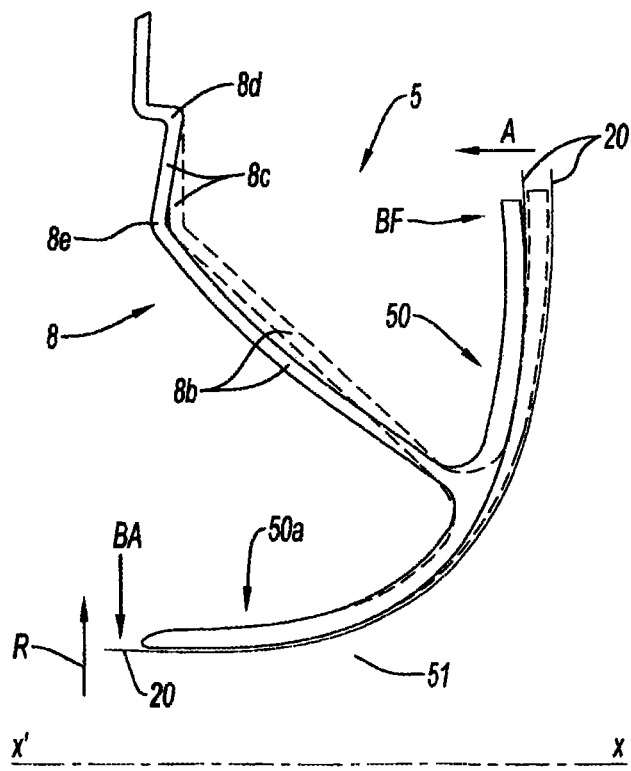

FIG. 4 shows, in the form of a cross section, the position of the cover 5 (in continuous lines) when the compressor and thus the blades 20 are in operation, as well as the position of the cover (in dotted lines) and blades 20 of the compressor in the rest position according to FIG. 2. In operation, the casing and the cover attachment also undergo the effects of pressure and temperature. In order to show clearly the effects of the solution according to the invention, in particular because of the flexibility of the attachment 8, the casing and cover attachment were drawn at FIG. 4 in the same position as the rest position of FIG. 2.

In operation, under the influence of pressure and temperature, the blades 20 move upstreamwardly (arrow A) at trailing edge BF and the axial part 50a (substantially parallel to axis X'X) of the shell 50 moves radially (arrow R) at leading edge BA.

Thanks to flexion of the radial rim 8c and arm 8b of the attachment 8—in other words because of variation in the joint angles of the elbows 8d and 8e—the inner surface 51 of the shell 50 follows the movements undergone by the blades 20. Thickness "E", as far as its mean and variation up to junction 83 are concerned, and length "L" of the arm 8b can be advantageously adjusted so as to enable also an appropriate arm flexion according to compressor conformation. The behaviour of the cover remaining very close to that of the impeller, clearance adjustment is thus adjusted to minimum.

Compared with a previous conformation with direct attachment, i.e. without joint, the result of it is an adjustment which makes it possible to obtain mounting clearances that are strongly reduced and optimized at intermediate and transient speeds. For example, at trailing edge, the assembly clearance can be reduced by 120%, which leads to a clearance reduction of 54% at an intermediate speed requiring optimal engine performance.

The invention is not limited to the described and shown exemplary embodiment. For instance, it is possible to position the double-elbow joint closer to the centre of the attachment while preferably keeping it closer to the rim for attachment to the casing than to the cover. Also, several joints having appropriate dimensions can be designed around the radial rim. Besides, the obtuse angle of the frusto-conical arm at rest can preferably vary within a 120 to 150° range.

It is also possible to design a slightly bent, concave or convex, arm or even an also slightly concave or convex radial rim. The dimensional characteristics of the arm 8b, namely its thickness "E", the evolution of which is not necessarily linear up to the junction, and length "L", which is for example 3 to 4 times as big as the rest of the attachment, can be adjusted, in addition to the characteristics of the double-elbow joint, in order to get the appropriate flexion of the whole attachment.

Furthermore, other types of an elastically deformable portion can be provided: use of different materials for the said portion and for the arm; portion having corrugations and/or made of holed material; any other form and other appropriate treatment.

The invention claimed is:

1. A method for attaching an impeller cover of a centrifugal compressor of a turbine engine, the cover including a concave shell and an axisymmetric connection forming an attachment between a junction formed substantially in a middle of the shell and a peripheral axial attachment holding the shell apart from the impeller, the method comprising:
arranging an elastically deformable portion including a radial rim and a double-elbow joint on the connection closer to a first end for attachment than to a second end for junction to the shell so that a distance between the shell and the impeller is held constant with minimal clearances at intermediate and transient speeds of the turbine engine,
wherein, at a rest position, the double-elbow joint includes a first elbow at a substantially right angle at a first end of the radial rim, and a second elbow at an obtuse angle at a second end of the radial rim, the first elbow being disposed radially outward of the second elbow.

2. An attaching method according to claim 1, wherein the deformable portion is arranged near the first end for attachment of the connection.

3. An attaching method according to claim 1, wherein the connection joins the shell according to a conformation that is substantially radial with regard to a curvature of the shell at the junction.

4. A cover for a centrifugal compressor of a turbine engine, the cover comprising:
a concave shell with an inner surface that can be arranged apart from the compressor including an impeller including blades by an attachment having a first junction end formed substantially in a middle of the shell and a second end that can be fixed to a turbine engine,
wherein the attachment includes an axisymmetric diaphragm of generally frusto-conical conformation that has an arm profile coupled together, at the second end for attachment, with the shell by a double-elbow joint having right and obtuse angles when in a rest position, the joint being arranged closer to the second end for attachment than to the first end for junction to the shell so that a distance between the inner surface of the shell and upper edges of the blades can be held constant during operation with minimal clearances at intermediate and transient speeds, and
wherein the double-elbow joint includes a radial rim in which a first elbow having a substantially right angle is provided at a first end of the radial rim and a second elbow having an obtuse angle is provided at a second end of the radial rim, the first elbow being disposed radially outward of the second elbow.

5. A cover for a centrifugal compressor according to claim 4, wherein the diaphragm includes an axial annular connection between a radial attachment rim and the double-elbow joint.

6. A cover for a centrifugal compressor according to claim 4, wherein the arm has a substantially rectilinear profile when in the rest position and an evolutionary thickness that increases near the junction end.

7. A cover for a centrifugal compressor according to claim 4, wherein the arm has on average a thickness substantially lower than that of the shell of the cover.

8. An assembly of a cover and a centrifugal compressor of a turbine engine, the cover being configured according to claim 4 so that the cover stays at a constant distance from the compressor during operation and the cover can be fixed to a casing of the turbine engine.

* * * * *